(12) United States Patent
King

(10) Patent No.: US 10,929,375 B2
(45) Date of Patent: Feb. 23, 2021

(54) AUTO-ADJUSTING DATA LOG RECORD TIMESTAMPS

(71) Applicant: Hubbell Incorporated, Shelton, CT (US)

(72) Inventor: Jonathan David King, Thomasville, NC (US)

(73) Assignee: Hubbell Incorporated, Shelton, CT (US)

( * ) Notice: Subject to any disclaimer, the term of this patent is extended or adjusted under 35 U.S.C. 154(b) by 413 days.

(21) Appl. No.: 15/437,675

(22) Filed: Feb. 21, 2017

(65) Prior Publication Data

US 2017/0242883 A1 Aug. 24, 2017

Related U.S. Application Data

(60) Provisional application No. 62/298,323, filed on Feb. 22, 2016.

(51) Int. Cl.
*G06F 16/23* (2019.01)
*G06F 16/11* (2019.01)
*G06F 17/40* (2006.01)

(52) U.S. Cl.
CPC ........ *G06F 16/2322* (2019.01); *G06F 16/113* (2019.01); *G06F 16/2379* (2019.01); *G06F 17/40* (2013.01)

(58) Field of Classification Search
CPC . G06F 16/2322; G06F 16/2379; G06F 16/113
USPC ...................................................... 707/668
See application file for complete search history.

(56) References Cited

U.S. PATENT DOCUMENTS

| 5,941,915 A * | 8/1999 | Federle .................... G07C 5/04 340/438 |
| 6,173,418 B1 * | 1/2001 | Fujino ................. G06F 11/3476 714/20 |
| 6,282,431 B1 * | 8/2001 | Konno ................. G04G 9/0076 368/21 |
| 6,888,708 B2 | 5/2005 | Brungs et al. |
| 7,762,786 B2 | 7/2010 | Taylor et al. |
| 7,836,264 B2 | 11/2010 | East et al. |

(Continued)

FOREIGN PATENT DOCUMENTS

JP 2012216040 * 11/2012 ............. G06F 11/34

OTHER PUBLICATIONS

Hubbell Industrial Controls, Inc. Catalog "Metro Fire Pump Controls" 273 pages, 2012.

(Continued)

*Primary Examiner* — Tony Mahmoudi
*Assistant Examiner* — Michael Le
(74) *Attorney, Agent, or Firm* — Wissing Miller LLP

(57) ABSTRACT

The present disclosure provides a method for automatically adjusting data log record timestamps in response to a change in a system clock. The method includes monitoring the system clock to track changes to the system clock, creating or updating a time delta log when a system clock change is detected, creating or updating a look-up table containing an absolute time adjustment value (ATA) for each time delta record in the time delta log, and adding a time delta ID to the data log record so that when a data log record is retrieved from memory the timestamp forming part of the data log record is automatically adjusted.

15 Claims, 16 Drawing Sheets

(56) References Cited

U.S. PATENT DOCUMENTS

| | | | |
|---|---|---|---|
| 8,482,307 | B2 | 7/2013 | Pullen |
| 9,430,501 | B1* | 8/2016 | Yen ..................... G06F 16/1734 |
| 2006/0171523 | A1* | 8/2006 | Greenwell .............. H04W 4/00 |
| | | | 379/242 |
| 2006/0225073 | A1* | 10/2006 | Akagawa .................. G06F 9/52 |
| | | | 718/1 |
| 2008/0208938 | A1 | 8/2008 | Lin et al. |
| 2008/0263105 | A1* | 10/2008 | Nakamura .......... H04L 43/0817 |
| 2009/0135854 | A1 | 5/2009 | Bettin et al. |
| 2010/0082531 | A1* | 4/2010 | Sakamoto ........... G06F 11/3476 |
| | | | 707/609 |
| 2012/0017093 | A1 | 1/2012 | Savitzky et al. |
| 2012/0170905 | A1* | 7/2012 | Brundula ................. H04N 5/76 |
| | | | 386/239 |

OTHER PUBLICATIONS

International Search and Written Opinion mailed in corresponding Application PCT/US17/18646 dated Apr. 28, 2017 (8 pages).
International Preliminary Report on Patentability mailed in corresponding PCT/US2017/018646 dated Aug. 28, 2018 (6 pages).
Supplemental European Search Report mailed in corresponding EP17757049 dated Aug. 1, 2019 (9 pages).

* cited by examiner

| | List View | Detail View | | | | | Date | |
|---|---|---|---|---|---|---|---|---|
| | Sunday | Monday | Tuesday | Wednesday | Thursday | Friday | Saturday | |
| | Jan 31 | Feb 01<br>Events: 10<br>Alarms: 4<br>Pressure: 65 | 02<br>Starts: 1<br>Events: 17<br>Alarms: 4<br>Pressure: 58 | 03<br>Events: 12<br>Alarms: 2<br>Pressure: 65 | 04<br>Events: 19<br>Alarms: 3<br>Pressure: 57 | 05<br>Events: 10<br>Pressure: 70 | 06<br>Events: 13<br>Alarms: 4<br>Pressure: 62 | |
| | 07<br>Events: 8<br>Alarms: 1<br>Pressure: 70 | 08<br>Events: 14<br>Alarms: 3<br>Pressure: 63 | 09<br>Events: 13<br>Alarms: 9<br>Pressure: 57 | 10<br>Starts: 1<br>Events: 9<br>Alarms: 5<br>Pressure: 64 | 11<br>Events: 14<br>Alarms: 2<br>Pressure: 64 | 12<br>Events: 16<br>Alarms: 2<br>Pressure: 61 | 13<br>Events: 13<br>Alarms: 3<br>Pressure: 63 | |
| | 14<br>Starts: 1<br>Events: 12<br>Alarms: 5<br>Pressure: 61 | 15<br>Events: 8<br>Alarms: 3<br>Pressure: 41 | 16 | 17 | 18 | 19 | 20 | |
| | 21 | 22 | 23 | 24 | 25 | 26 | 27 | |
| | 28 | 29 | Mar 01 | 02 | 03 | 04 | 05 | |
| | 06 | 07 | 08 | 09 | 10 | 11 | 12 | |

FIG. 13

| | | Day of Week Time of Day |
| --- | --- | --- |
| Motor Status | System Standby - In Automatic Mode | Alarms |
| Idle | ▫ Auto Weekly Test Disabled | No Alarms |
| System Pressure | Connected to NORMAL SOURCE | |
| 100 PSI | AB 380V    0I | |
| | BC 380V    0I | |
| Start:           90 PSI<br>Stop:           120 PSI<br>Automatic Stop: Disabled | AC 380V    0I | |

*FIG. 15*

AUTO-ADJUSTING DATA LOG RECORD TIMESTAMPS

CROSS REFERENCE TO RELATED APPLICATIONS

The present application is based on and claims benefit from U.S. Provisional Application Ser. No. 62/298,323 filed Feb. 22, 2016 entitled "Auto-Adjusting Data Log Record Timestamps" the entire contents of which are herein incorporated by reference.

BACKGROUND

Field

The present disclosure relates generally to methods for automatically adjusting data log records. More particularly, the present disclosure relates to methods for automatically adjusting data log record timestamps and to systems that utilize such methods including fire pump control systems.

Description of the Related Art

Fire protection systems, sometime referred to as fire suppression systems, deployed in large buildings commonly utilize fire pump control systems to control the flow of water to sprinkler heads. The fire pump control systems operate a water pump system used to pump high pressure water to the sprinkler heads. The fire pump control systems are also connected to various fire detectors and sensors, and in the event of a fire, activate the water pump system to supply water to the sprinkler heads near the location of the fire. To activate or deactivate the water pump system, the fire pump control system is used to control the starting and stopping of electric motors used in the water pump system, to control the water pressure, and to control the flow rate.

Fire protection systems are typically supplied power from standard utility power lines as the primary source of power, and may use alternate circuits, or gasoline or diesel powered generators as a secondary power source (e.g., a back-up power source) to provide electrical power to the fire pump control system and water pump system in the event of a primary power outage. Fire protection systems with a back-up generator include a transfer switch assembly that senses a loss of utility power, starts the generator if a generator is the secondary source of power, and then switches the power supply to the secondary power source for the fire pump control system and the water pump system so that the fire protection system is remains active. The electric motors that operate the water pumps are generally large, powerful, and they require large amounts of electrical power to operate, especially when starting the motors. Fluctuations in the motor's operation caused by, for example, starting the motor can cause sudden increases and decreases in the water pressure within the water pipes of the fire protection system. Such sudden changes in water pressure, and particularly sudden increases in water pressure, can cause damage to the valves, pumps, pressure regulators and other equipment within the fire protection system.

Current fire protection system regulations require that the fire pump control system for operating the water pump, valves, pressure regulators, and the like, be separate from the transfer switch assembly. In some fire protection systems, the fire pump control system and transfer switch are assembled in separate housings or cabinets, increasing the floor space needed to install the fire protection system. A large floor space increases construction and installation costs for the fire protection system. In some fire protection systems, the fire pump control system and transfer switch assembly are incorporated in a single housing or cabinet that has isolated compartments—one for the fire pump control system and one for the transfer switch assembly.

Many fire pump control systems are computer controlled systems capable of monitoring various components within the fire protection system, controlling operation of the transfer switch assembly, and controlling the water pump system. Computer controlled fire pump control systems have a system clock enabling the computer system to store data log records in a data log, that include timestamps for the date and time each record was created. However, if a user changes the system clock, or if the system clock is otherwise changed, the accuracy of the timestamps for existing data log records stored in the data log may be rendered inaccurate. For example, a user could adjust the system clock in such a way that the timestamp for a new data log record entry indicates that the new record was created before an existing data log record.

The data log records are typically used to maintain an auditable record of the performance and operation of the fire pump control system and the transfer switch assembly, and to identify alarm patterns. However, if the fire pump control system's clock is changed so that the accuracy of the data log records may be in doubt, such data logs would require manual intervention to translate the record timestamp to the actual time of an event, if determinant at all, and thus would not be useful for real time analysis.

SUMMARY

The present disclosure relates to methods for automatically adjusting data log record timestamps, and to fire pump control systems that incorporate such methods. When the user changes the system clock, the timestamps for existing data log records are automatically updated to reflect the difference in time between the old system clock and the new system clock when a user retrieves a data log record from memory.

In one exemplary embodiment the method comprises, monitoring a system clock to detect changes to the system clock, adding a time delta record that includes a time delta ID, that may be an integer, and a time delta value to a time delta log when a system clock change is detected, creating a row in an absolute delta look-up table containing an absolute delta look-up table ID and an absolute time adjustment value for each time delta record in the time delta log, adding a time delta ID to subsequent data log records so that when a data log record is retrieved from memory the timestamp forming part of the data log record can be automatically adjusted, and upon retrieval of a data log record from memory, adjusting the timestamp of the retrieved data log record based upon the absolute time adjustment value associated with the time delta ID of the data log record being retrieved.

The time delta value is based on a difference between a previous system clock time and a system clock time when the system clock change is detected. The absolute delta look-up table ID for each row in the absolute delta look-up table corresponds to the time delta ID in the corresponding time delta record in the time delta log. The absolute time adjustment value for each row in the absolute delta look-up table comprises a sum of a corresponding time delta value in the time delta log and all succeeding time delta values in the time delta log.

In another exemplary embodiment the method comprises, monitoring a system clock to detect changes to the system clock, calculating a time delta value representing a difference between a previous system clock time and a system clock time when the system clock change is detected, adding a time delta record to a time delta log, wherein the time delta record comprises a unique time delta ID, that may be an integer, and the calculated time delta value, creating a row in an absolute delta look-up table containing an absolute delta look-up table ID and an absolute time adjustment value for each time delta record in the time delta log, adding a time delta ID to subsequent data log records so that when a data log record is retrieved from memory the timestamp forming part of the data log record can be automatically adjusted, and upon retrieval of a data log record from memory, adjusting the timestamp of the retrieved data log record based upon the absolute time adjustment value associated with the time delta ID of the data log record being retrieved.

The absolute delta look-up table ID for each row in the absolute delta look-up table corresponds to the time delta ID in the corresponding time delta record in the time delta log. The absolute time adjustment value for each row in the absolute delta look-up table comprises a sum of a corresponding time delta value in the time delta log and all succeeding time delta values in the time delta log.

In another exemplary embodiment the method comprises, monitoring a system clock to detect changes to the system clock, calculating a time delta value representing a difference between a previous system clock time and a system clock time when the system clock change is detected, adding a time delta record to a time delta log, wherein the time delta record comprises a unique time delta ID, that may be an integer, and the calculated time delta value, initializing an absolute delta look-up table, adding a time delta ID to subsequent data log records so that when a data log record is retrieved from memory the timestamp forming part of the data log record can be automatically adjusted, and upon retrieval of a data log record from memory, adjusting the timestamp of the retrieved data log record based upon an absolute time adjustment value associated with the time delta ID of the data log record being retrieved.

Initializing the absolute delta look-up table includes, creating a row in the absolute delta look-up table containing an absolute delta look-up table ID and the absolute time adjustment value for each time delta record in the time delta log, and creating an active delta index record in the absolute delta look-up table.

The absolute delta look-up table ID for each row in the absolute delta look-up table corresponds to the time delta ID in the corresponding time delta record in the time delta log. The absolute time adjustment value for each row in the absolute delta look-up table comprises a sum of a corresponding time delta value in the time delta log and all succeeding time delta values in the time delta log.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 13 is an illustration of an exemplary user interface for a calendar view for the fire pump controller;

FIG. 15 is an illustration of an exemplary user interface dashboard for the fire pump controller when a pump motor is in an idle mode;

DETAILED DESCRIPTION

In various types of automated systems where a computing system is used to monitor and control the operation of the automated system, data, such as events or alarms, relating to operation of the automated system are stored as records in a data log in the computing system memory, typically non-volatile memory. Each stored data log record typically includes a timestamp so that, for example, the computing system knows the time and date when an event or alarm occurred. Timestamps are typically based off the computing system clock (or the system clock) so that the accuracy of the system clock determines the accuracy of the timestamp for newly stored records as well as for previously stored records. As noted above, if the system clock is changed, the accuracy of the timestamps for the stored records may be in doubt. The present disclosure provides a method for automatically adjusting data log record timestamps in response to a change in the system clock. The method includes monitoring the system clock to detect changes to the system clock, creating or updating a time delta log (TDL) when the system clock is changed, creating a look-up table containing an absolute time adjustment (ATA) for each time delta record in the TDL, and adding a time delta ID to the data log record so that when a data log record is retrieved from memory the timestamp forming part of the data log record can be automatically adjusted, and upon retrieval of a data log record from memory, adjusting the timestamp of the retrieved data log record.

Figure 1:
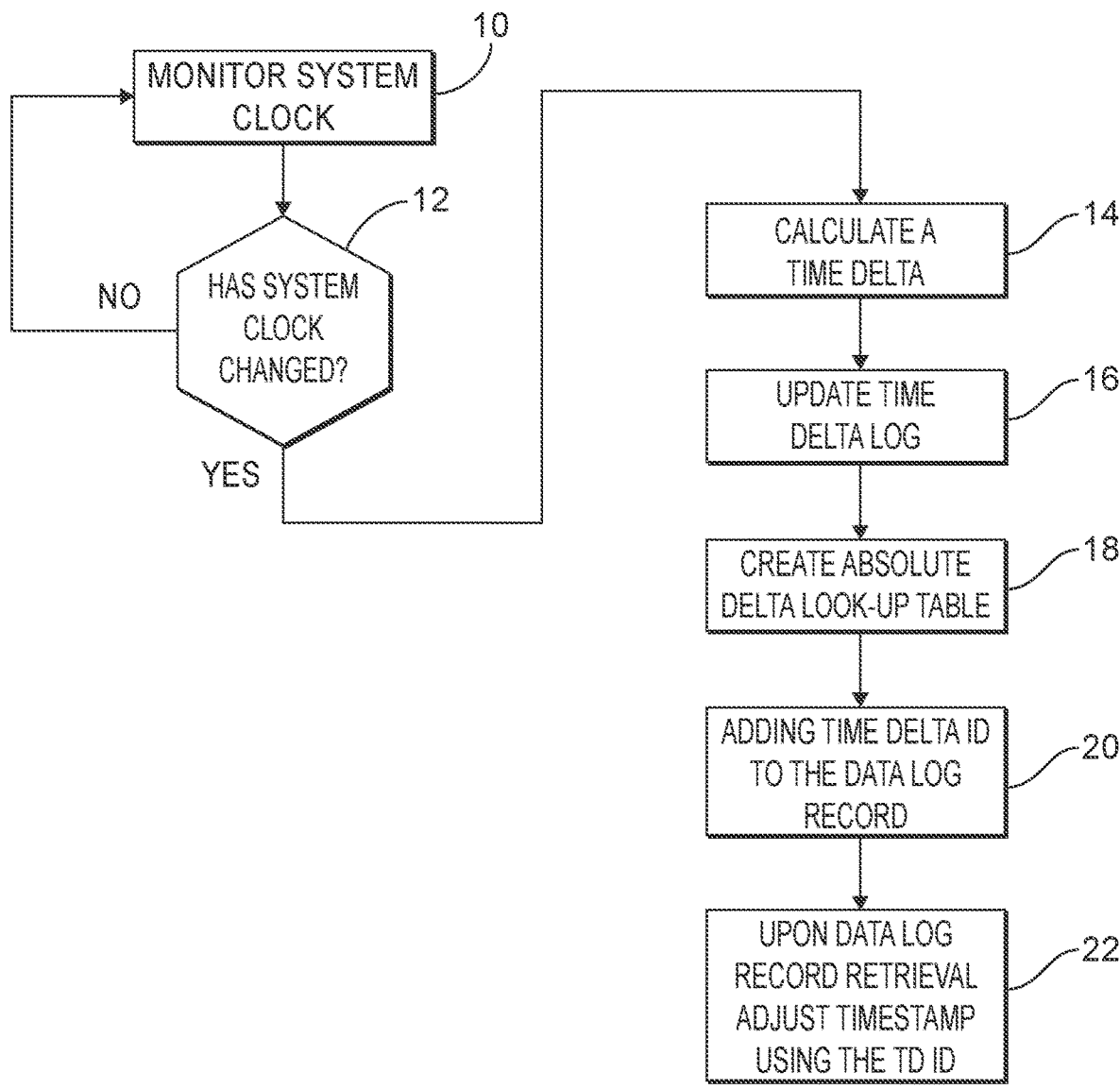
FIG. 1 is a flow diagram for an exemplary method of automatically adjusting data log record timestamps according to the present disclosure.
Figure 2:
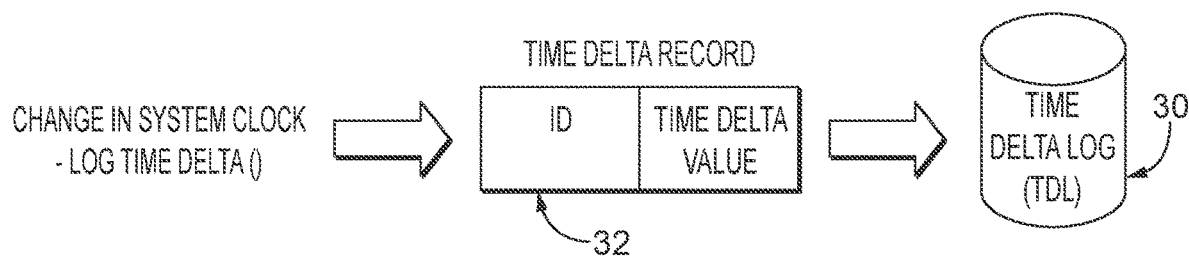
FIG. 2 is a flow representation for creating a record in the time delta log when the system clock is changed.

Referring to FIGS. 1-4, the method for automatically adjusting data log record timestamps according to the present disclosure uses the data log to track changes to the system clock. Initially, at step 10, the computing system, such as computing system 150 seen in FIG. 12 and described in more detail below, monitors the system clock for changes to the system clock. If a system clock change is detected at step 12, a time delta (TD) is calculated by the computing system, at step 14. The time delta is the difference, typically in seconds, between the previous system clock time and the new system clock time. At step 16, a time delta log (TDL) 30 storing time delta records 32 of system clock changes is updated. More particularly, a time delta record 32 associated with the detected system clock change is created and stored in the time delta log 30. Each time delta record 32 includes the time delta and a unique time delta identifier (ID), such as an identification number that can be an integer that typically starts at zero and is incremented by one for each time delta record 32 stored in the time delta log 30. FIG. 2 is a flow representation showing a time delta record 32 with a unique time delta ID and a time delta value, and time delta log 30. Typically, the time delta log would be stored in non-volatile memory of the computing system, e.g., computing system 150, seen in FIG. 12.

Figure 3:
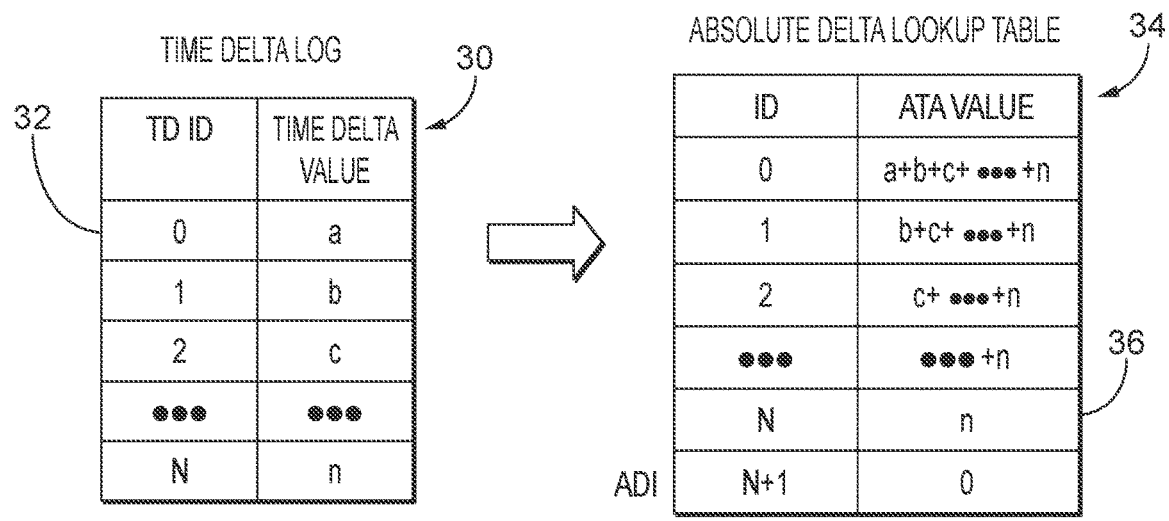
FIG. 3 is a flow representation for creating an absolute time adjustment lookup table.

The time delta records in the time delta log are used to create an absolute delta lookup table 34, step 18. FIG. 3 is a flow representation showing the time delta log 30 being used to build the absolute delta look-up table 34. The absolute delta lookup table 34 may be stored in volatile memory of the computing system, such as RAM, such that the absolute delta lookup table 34 is recreated each time the computing system is powered up. In another embodiment, the absolute delta lookup table 34 may be stored in non-volatile memory. The number of records in the absolute delta lookup table 34 grows with each detected change in the system clock. Each row in the absolute delta lookup table 34 contains an ID that corresponds to the time delta ID, and an absolute time adjustment (ATA) value, which is relative to the system clock. More specifically, the absolute time adjustment value in each absolute delta lookup table row 36 is determined by calculating the sum of the corresponding time delta value in the corresponding time delta log 30 and all succeeding time delta values in the time delta log.

The absolute delta lookup table 34 initialization is, in this exemplary embodiment, a two-step process. The first step creates an absolute delta lookup table record 36 for each record in the time delta log 30. As noted, each absolute delta lookup table record 36 contains a numeric ID, which matches the time delta ID of that record's corresponding record in the time delta log. Each record in the absolute delta lookup table 34 also contains the absolute time adjustment value, which is the sum of the time delta value for the corresponding time delta log record 32 and the time delta values for all succeeding records in the time delta log. For example, as shown in FIG. 3, the absolute time adjustment value for absolute delta lookup table ID 0 (corresponding to time delta ID 0) is the sum of time delta values a+b+c+ . . . +n, the absolute time adjustment value for absolute delta lookup table ID 1 (corresponding to time delta ID 1) is the sum of time delta values b+c+ . . . +n, the absolute time adjustment value for absolute delta lookup table ID 2 (corresponding to time delta ID 2) is the sum of time delta values c+ . . . +n, and the absolute time adjustment value for absolute delta lookup table ID N (corresponding to time delta ID N) is the value n. The second step in the two-step absolute delta lookup table 34 initialization process creates an additional record in the absolute delta lookup table 34, called an active delta index (ADI). The absolute delta lookup table ID for the active delta index is one record higher than the time delta ID of the last record in the time delta log 30. If the time delta log 30 is empty, the absolute delta lookup table ID for the active delta index is set to 0. The absolute time adjustment value of the active delta index record is set to zero. The active delta index is a reference associated with a next-to-be-used time delta ID that does not exist in the time delta log 30, i.e., it does not yet exist in the non-volatile memory. Thus, the active delta index is associated with a time delta ID that does not yet exist. Because the active delta index is associated with a time delta ID that does not yet exist, the absolute time adjustment value is set to zero. In other words, the absolute time adjustment value associated with the active delta index associates a timestamp to the current system clock.

Figure 4:
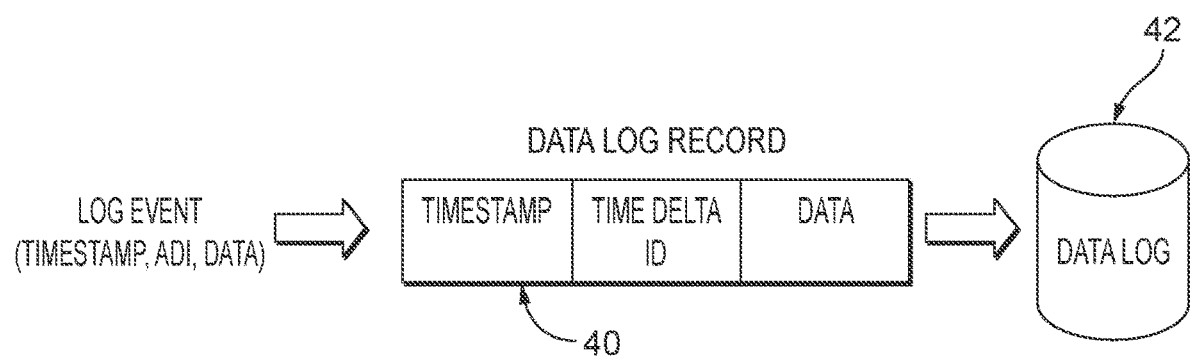
FIG. 4 is a flow representation for including in data log records time delta ID's later used to adjust a timestamp in a data log record.

The absolute delta lookup table 34 is used to adjust the timestamp in each data log record 40 in the data log 42, step 20. FIG. 4 is a flow representation showing the data log records 40 being created and stored in the data log 42. Typically, the data log 42 would be stored in non-volatile memory of the computing system. When the system clock is changed, the timestamps in existing data log records 40 are not modified. Instead, all data log records 40 stored in the data log 42 after the system clock change are adjusted at the time when the logs are retrieved by users. By including the time delta ID in the data log record 42 and then when displaying a data log record 40, the associated time delta unique ID is used to retrieve the corresponding absolute time adjustment value from the absolute delta lookup table 34, which is then added to or subtracted from the timestamp in the data log record being retrieved.

Figure 5:
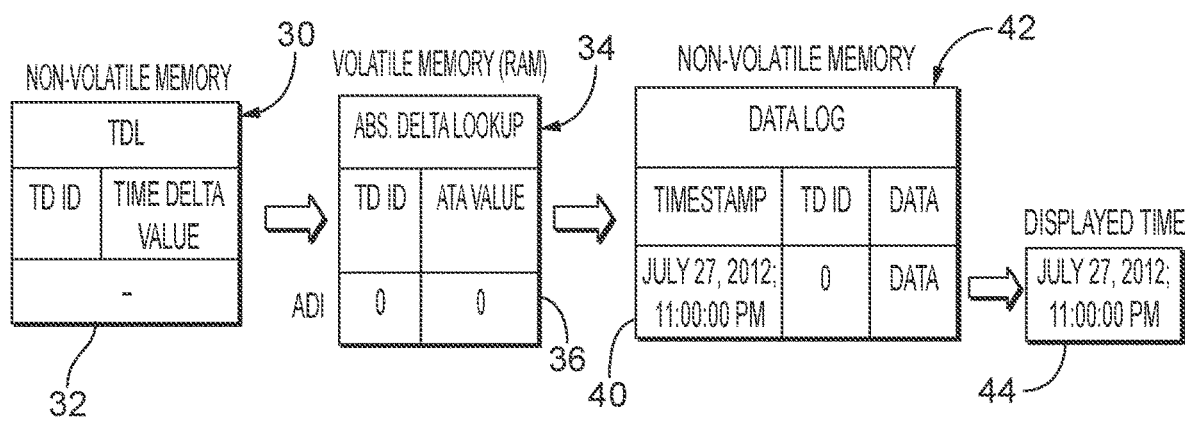
FIG. 5 is a memory allocation diagram when a new data log record is created at a first point in time.

Referring to FIGS. 5-8, an example of the method for automatically adjusting a data log record timestamp will be described. In FIG. 5, the computing system clock is at 11:00:00 pm on Jul. 27, 2012, and a new data log record 40 is to be stored in the data log 42. At this time, the time delta log 30 is empty because no previous system clock change has occurred in this exemplary embodiment. The absolute delta lookup table 34 has a row 36 with an absolute delta lookup table ID set to 0 (corresponding to time delta ID 0), and the absolute time adjustment value set to 0 because the active delta index (ADI) is set to 0, as described above. Thus, the data log record 40 in data log 42 includes the timestamp of Jul. 27, 2012; 11:00:00 pm reflecting the time and date when the record was created, a time delta ID of 0, reflecting the value of the active delta index value. When the data log record 40 is retrieved by a user, the computing system uses the absolute time adjustment (ATA) value in the lookup table 34 associated with the time delta ID 0, which in this case is the active delta index, to calculate the adjusted time stamp value 44, and is the same as the original timestamp of Jul. 27, 2012; 11:00:00 pm. The computing system then displays the adjusted timestamp 44 for that data log record 40 when it displays the data log record on the computing system display, or the adjusted time can be exported to another medium, such as a file on a USB memory stick via USB port 160 and media reader 162, seen in FIG. 12.

Figure 6:
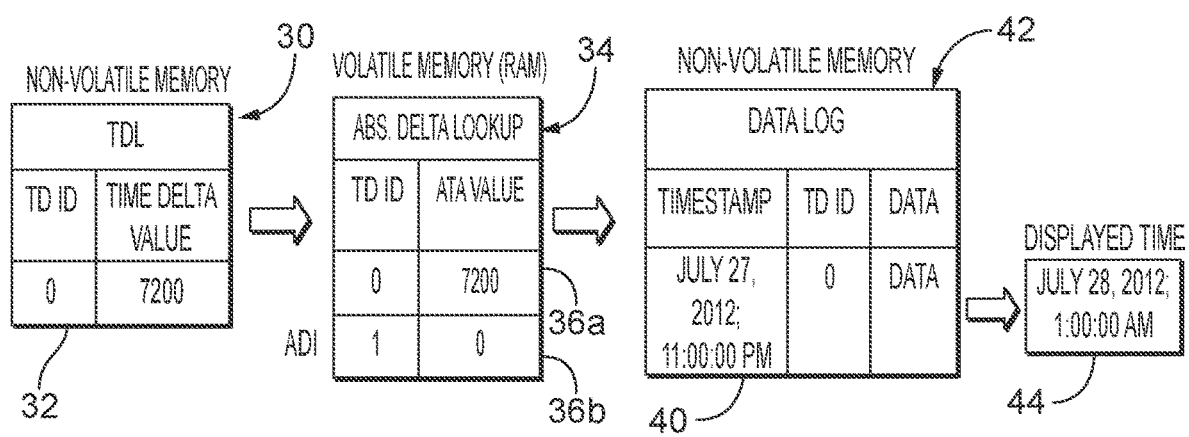
FIG. 6 is a memory allocation diagram when a system clock change is detected at a second point in time.

In FIG. 6, the computing system detected that the system clock changed by 2 hours from 11:00:00 pm to 1:00:00 am so that the new system clock is at 1:00:00 am on Jul. 28, 2012. At this time, the first row 32 in the time delta log 30 has a time delta ID set to 0, and the time delta is 7200 seconds, which reflects the number of seconds in 2 hours. The absolute delta lookup table 34 has a first row 36a with an absolute delta lookup table ID set to 0 (corresponding to time delta ID 0) and an absolute time adjustment value set to 7200 seconds because at that moment in time the absolute time change is +2 hours (7200 seconds). A second row 36b in the absolute delta lookup table 34 is the new active delta index (ADI) and is associated with absolute delta lookup table ID 1 (corresponding to the next-to-be-created time delta ID of 1), and the absolute adjustment value is set to 0, because the absolute time adjustment value for the active delta index is set to 0, as described above. Thus, the data log 42 includes a data log record 40 that includes the timestamp of Jul. 27, 2012; 11:00:00 pm reflecting the time and date when the record was created, and a time delta ID of 0, which reflects the value of the active delta index (ADI) at the time the data log record 40 was created. When the data log record 40 is retrieved by a user, the computing system uses the absolute time adjustment value in the lookup table 34 associated with the time delta ID 0, here row 36a, to calculate the adjusted timestamp value 44. In this embodiment, the adjusted timestamp value is increased by 2 hours to Jul. 28, 2012; 1:00:00 am, and the computing system displays the adjusted timestamp for that data log record when it displays the data log record on the computing system display, or the adjusted time can be exported to another medium, such as a file on a USB memory stick via USB port 160 and media reader 162, seen in FIG. 12.

Figure 7:
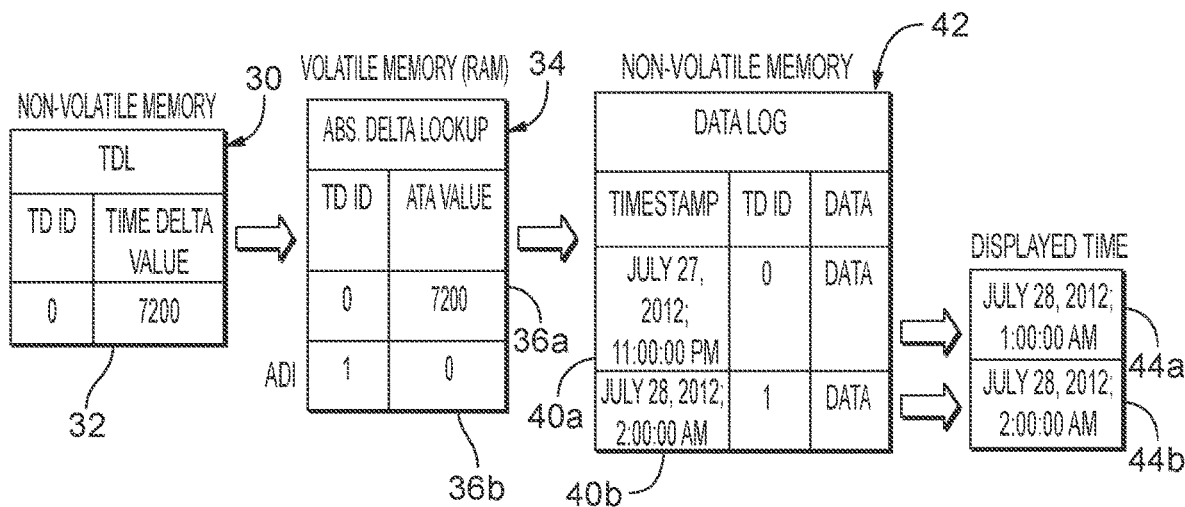
FIG. 7 is a memory allocation diagram when a new data log record is created at a third point in time.

In FIG. 7, the computing system is creating a new data log record with the system clock at 2:00:00 am on Jul. 28, 2012. At this time, the first row 32 in the time delta log 30 still has a time delta ID set to 0 and the time delta is 7200 seconds, which reflects the number of seconds in 2 hours from the previous time change detected by the computing system. The absolute delta lookup table 34 has the first row 36a with an absolute delta lookup table ID set to 0 (corresponding to time delta ID 0) and an absolute time adjustment value set to 7200 seconds reflecting the absolute time change of +2 hours (7200 seconds) from the previous time change detected by the computing system. The second row 36b in the absolute delta lookup table 34 remains the active delta index (ADI) and is associated with time delta ID of 1, which has not yet been created, such that the absolute adjustment value remains 0. Thus, the data log 42 includes a first record 40a with the timestamp of Jul. 27, 2012; 11:00:00 pm and a time delta ID of 0. The data log 42 also includes a second record 40b with the timestamp of Jul. 28, 2012; 2:00:00 am and a time delta ID of 1, which reflects the value of the active delta index. At this point in time, if the data log record 40a is retrieved by a user, the computing system uses the absolute time adjustment value in the lookup table 34 associated with the time delta ID 0, here row 36a, to calculate the adjusted time stamp value for data log record 40a. In this embodiment, the adjusted time stamp value is increased by 2 hours to Jul. 28, 2012; 1:00:00 am, and the computing system displays the adjusted timestamp 44a for that data log record 40a when it displays the data log record on the computing system display. At this point in time, if the data log record 40b is retrieved by a user, the computing system uses the absolute time adjustment value in the lookup table 34 associated with the time delta ID 1, which in this embodiment corresponds to the active delta index (ADI), here row 36b, to calculate the adjusted time stamp value for data log record 40b. In this embodiment, the adjusted time stamp value is adjusted by zero since there has been no system clock change since the time the data log record 40b was added to the data log 42. As a result, the computing system would display an adjusted timestamp 44b for that data log record 40b that is the same as the original timestamp for that data log record.

Figure 8:
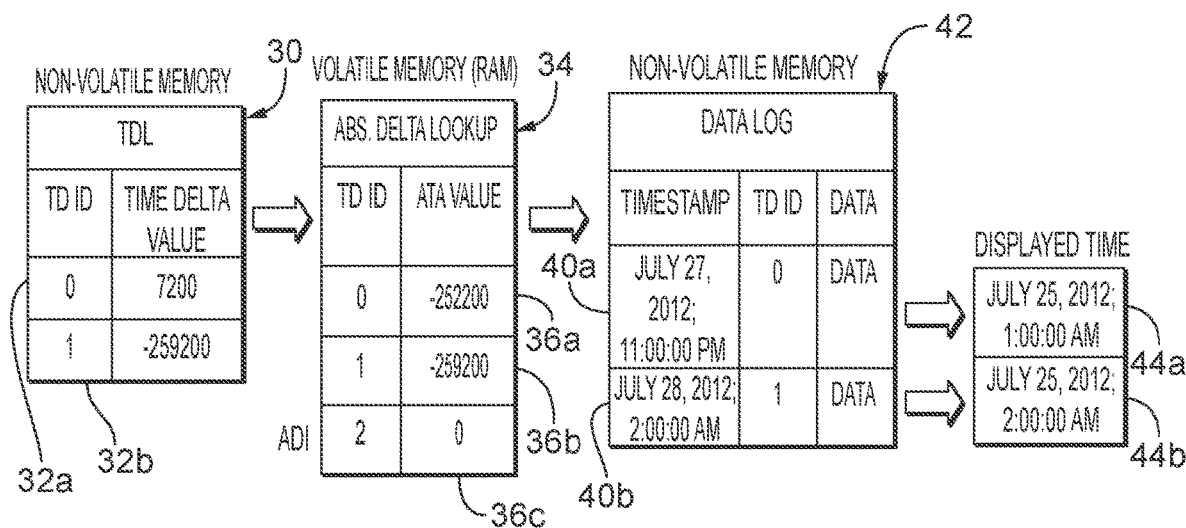
FIG. 8 is a memory allocation diagram when a system clock changed is detected at a fourth point in time.

In FIG. 8, the computing system has detected that the system clock changed by −3 days from Jul. 28, 2012; 5:00:00 am to Jul. 25, 2012; 5:00:00 am so that the new system clock is at 5:00:00 am on Jul. 25, 2012. This detected system clock change is added to the time delta log 30 as time delta record 32b in a manner described above. At this time, the first row 32a in the time delta log 30 still has a time delta ID set to 0 and the time delta value is 7200 seconds, which reflects the number of seconds in 2 hours from the previous system clock change detected by the computing system. At this time, a second row 32b in the time delta log 30 has a time delta ID set to 1 and the time delta value is −259200 seconds, which reflects the number of seconds in 3 days from the previous system clock change detected by the computing system. The absolute delta lookup table 34 has the first row 36 with an absolute delta lookup table ID set to 0 (corresponding to time delta ID 0) and an absolute time adjustment value set to −252200 seconds. The −252200 seconds is the sum of time delta values for time delta ID's 0 and 1 (rows 32a and 32b), namely −259200 seconds +7200 seconds, reflecting an absolute time change of −2 days and 22 hours from the previous time change detected by the computing system. The second row 36b in the absolute delta lookup table 34 is no longer the active delta index (ADI) and is associated with time delta ID of 1, which has an absolute time adjustment value set to −259200 seconds, reflecting an absolute time change of −3 days from the previous time change detected by the computing system. The third row 36c in the absolute delta lookup table 34 is now the active delta index (ADI) and is associated with time delta ID of 2, which has not yet been created, such that the absolute adjustment value is set to 0. Thus, the data log 42 includes a first record 40a with the timestamp of Jul. 27, 2012; 11:00:00 pm and the time delta ID at 0. The data log 42 also includes a second record 40b with the timestamp of Jul. 28, 2012; 2:00:00 am and the time delta ID at 1. At this point, if the data log record 40a is retrieved by a user, the computing system uses the absolute time adjustment value in the lookup table 34 associated with the time delta ID 0, here row 36a, to calculate the adjusted time stamp value for data log record 40a. In this embodiment, the adjusted time stamp value is decreased by 2 days, 22 hours to Jul. 25, 2012; 1:00:00 am, and the computing system displays the adjusted timestamp 44a for that data log record 40a when it displays the data log record on the computing system display. At this point, if the data log record 40b is retrieved by a user, the computing system uses the absolute time adjustment value in the lookup table 34 associated with the time delta ID 1, here row 36b, to calculate the adjusted time stamp value for data log record 40b. In this embodiment, the adjusted time stamp value is decreased by 3 days (−259200 seconds) to Jul. 25, 2012; 2:00:00 am, and the computing system displays the adjusted timestamp 44b for that data log record 40a when it displays the data log record on the computing system display.

Figure 9:
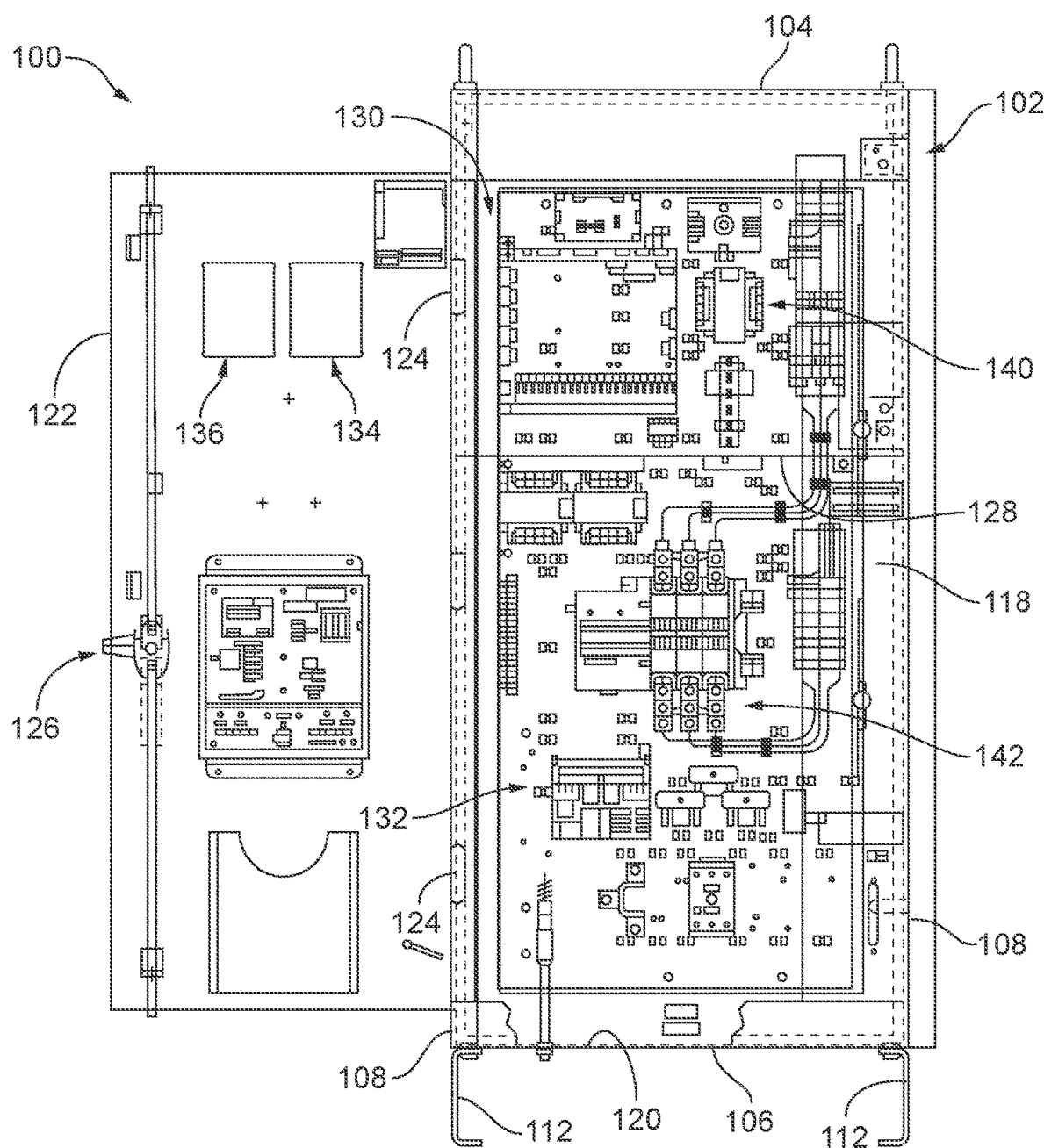
FIG. 9 is a front elevational view of an exemplary embodiment of a fire pump controller and transfer switch assembly according to the present disclosure.
Figure 10:
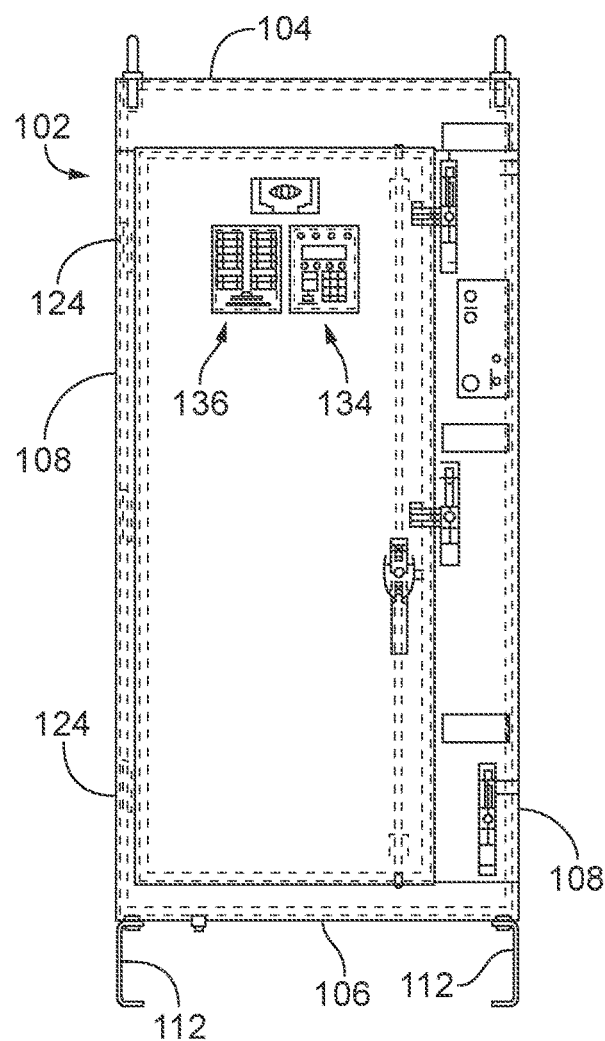
FIG. 10 is a rear elevational view of a door depicted in FIG. 9.
Figure 11:
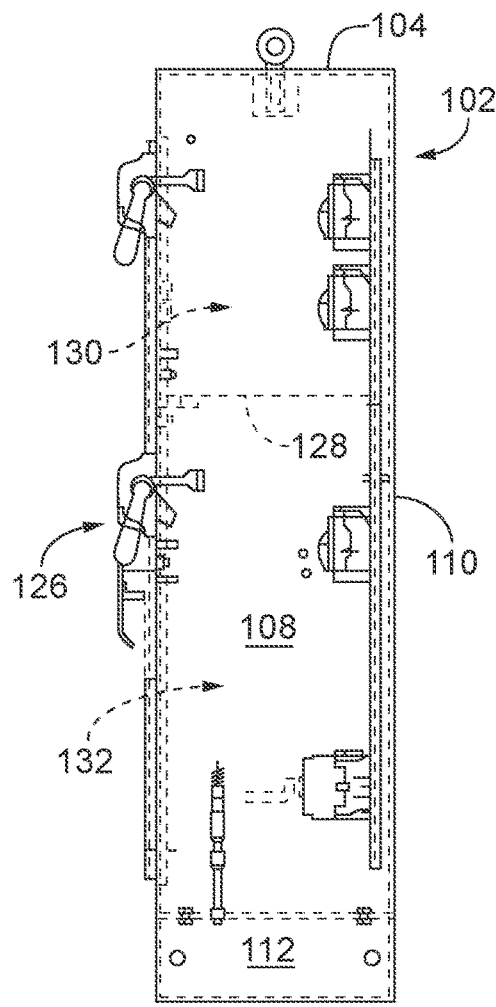
FIG. 11 is a side elevational view of the fire pump controller and transfer switch assembly depicted in FIG. 9.

The present disclosure also provides descriptions of embodiments for fire pump control systems and transfer switch assemblies that utilize the above-described method for automatically adjusting data log record timestamps. Referring to FIGS. 9-11, an exemplary embodiment of a fire pump controller and transfer switch assembly is provided. It is noted that the combined fire pump controller and transfer switch assembly may also be referred to herein as the "fire controller." In this exemplary embodiment, the fire controller 100 includes a cabinet 102 having a top wall 104, a bottom wall 106, opposite side walls 108 and a back wall 110. The back wall 110 is coupled to the side walls, top wall, and bottom wall to form an enclosure. A pair of side panels forming legs 112 are coupled to bottom wall 106 to support and stabilize cabinet 102. In the embodiment shown, a front wall 118 having an access opening 120 is coupled to the enclosure. The access opening 120 is dimensioned to enable workers to install and repair the various electrical components of the fire controller 100. Typically, cabinet 102 is constructed from several fire resistant panels that are coupled together by suitable connections such as welding, riveting, or other fasteners or fastening techniques. The panels that make up the enclosure, e.g., the side, top, bottom, and back walls, can be made of steel or other rigid fire retarding materials sufficient to form the enclosure. An access door 122 is mounted on the front wall 118 by hinges 124 to close the access opening 120. A suitable locking assembly 126 is provided on the access door 122 to lock the door and prevent unauthorized access to the system components. The access door 122 can be made of steel, or other rigid fire retarding materials.

In the exemplary embodiment of FIGS. 9-11, the cabinet 102 also includes an internal wall 128 to separate the interior of the cabinet into compartments, for example, a first compartment 130 and a second compartment 132. In one embodiment, cabinet 102 has a substantially rectangular upright shape and internal wall 128 is oriented in a substantially horizontal position. Typically, the internal wall 128 is made of steel and forms a fire resistant barrier between the first compartment 130 and the second compartment 132. In the horizontal configuration, the internal wall 128 is typically fixed to the opposite side walls 108 and back wall 110 where the edges abut the respective side and back walls without gaps or openings between internal wall 128 and the opposite side walls 108 and the back wall 110. In other embodiments, the internal wall 128 may take other shapes, such as a C-shape or a U-shape, where the internal wall 128, one side wall 108, and a portion of the back wall 110 form one compartment, and the remainder of the interior of the cabinet 102 form the second compartment.

Various openings (not shown), which can be knock-outs or pry-outs, are provided on the interior wall 128 to enable electrical connections between the electrical components in the respective compartments. The openings through the internal wall 128 can include a suitable coupling member, clamp member or seal between the first compartment 130 and the second compartment 132 that protect wires passing through the opening and provide a fire resistant seal. The openings in the internal wall 128 can be arranged with the electrical components in the compartments to provide the shortest run of electrical wiring between the electrical components.

Continuing to refer to FIGS. 9-11, the fire controller 100 includes a fire pump controller (FPC), indicated generally at 140 in FIG. 9, and an automatic transfer switch (ATS) assembly, indicated generally at 142. As shown, the FPC 140 is mounted within, for example, the first compartment 130, and the ATS assembly 142 is primarily mounted within, for example, the second compartment 132. As a result, the ATS assembly 142 is separated from the FPC 140 by internal wall 128, which forms a fire resistant barrier separating FPC 140 from the ATS assembly 142.

Generally, the fire controller 100 provides control and operation of a fire pump motor to supply water to sprinkler systems, stand pipes and/or other fire protection systems. The FPC 140 is operatively connected to an electric motor for driving a pump to supply the water to the fire protection system in the event of a fire. Under normal operating conditions, the FPC 140 and the electric motor of the pump are operated by a primary three phase electrical power source. In the event of power failure on the primary power source, the ATS 142 senses the power failure and automatically switches to a secondary or auxiliary power source to ensure continuous and reliable operation of the fire protection system. For example, the secondary power source can be a different electrical circuit or power source, and the ATS 142 can switch to the different electrical circuit or power source to maintain power to the pump motor and the FPC 140. As another example, the secondary power source can be a power generator driven by an internal combustion engine, and the ATS 142 can be operatively connected to power generator to maintain power to the pump motor and the FPC 140. In the event the secondary power source is a power generator, the ATS 142 can be designed to automatically start the internal combustion engine in the event of a primary power failure and then switch to the secondary power source to maintain operation of the pump motor and the FCP 140. The components of exemplary FPC 140 and ATS 142 and their operation are described in more detail in commonly owned U.S. Pat. No. 7,762,786, which is incorporated herein in its entirety by reference.

The FPC 140 is designed to control the pump motors and to control and/or monitor sensors, transducers, valves and other components within the fire protection system. In particular, the FCP 140 controls the electric pump motors where the power source does not permit starting of the electric motor at full voltage. The FCP 140 preferably provides start and stop operation of the electric pump motor to reduce mechanical and hydraulic stress on the plumbing of the fire protection system.

The FCP 140 can be an automatic controller, or a combined manual and automatic controller. For the automatic functions of the FCP 140, one or more computing systems, e.g., microprocessors and supporting components or microcontrollers, can be used to control and monitor the operation of the pump motor, e.g., is it idle or running, perform self-test functions, and the overall fire protection system. For example, the FPC 140 can monitor sensors and transducers, e.g. pressure transducers that measure how components of the fire protection system are operating, to detect events and alarms related to the fire controller 100 and/or the fire protection system. Events measured by and alarms detected by the FPC 140, are logged into data log records 40, and stored in the data log 42. Examples of events and alarm data stored in a data log record is set forth in Table 1 below:

TABLE 1

| Data Log Record Data | |
| --- | --- |
| Date and Time | Pressure |
| Voltage and current o connected source | Login state |
| Pressure | Internal temperature |
| State of every alarm | Which source the transfer switch is connected to |
| Whether normal/emergency power is available | The I/O state of all PCB's (excluding any add-on boards) |
| Active start conditions | The state of all aux programs (48 aux programs available). |
| Power available | |

Events detected by the FCP 140 and event messages generated by the FCP, such as the event messages set forth in Table 2 below, are stored in data log records 40 in the data log 42, and may be displayed via the display module 134, seen in FIG. 9, on the access door 122 of the fire controller 100.

TABLE 2

Event Messages

| | |
|---|---|
| Remote Test Start | CRR Energized/De-Energized |
| Manual Test Start | CSR Energized/De-Energized |
| Auto Test Start | Load Shed |
| Modbus Test Start | Soft Start On |
| Remote Start | Manual Stop |
| Modbus Start | Auto Stop |
| High Zone Call To Start | Acceleration Timer On |
| Deluge Start | Remote Lockout |
| Pressure Transducer Failure Start | Remote Lockout Cleared |
| Supervisory Power Failure Start | Dump Valve Opened |
| Low Pressure Start | Dump Valve Closed |
| Local Start | Dump Valve Insufficient Discharge |
| Pump Running | System Reboot |

Alarms detected by the FPC 140 and alarm messages generated by the FCP, such as the alarm messages set forth in Table 3 below, are stored in data log records 40 in the data log 42, and may be displayed via the display module 134, seen in FIG. 9, on the access door 122 of the fire controller 100.

TABLE 3

Alarm Messages

| | |
|---|---|
| Phase Failure (Normal & Emergency) | Locked Rotor |
| Phase Reversal (Normal & Emergency) | Motor Overload |
| Phase Over/Under Voltage (Normal & Emergency) | Low Suction |
| Phase Over/Under Frequency (Normal & Emergency) | Low Zone Fail To Start |
| Pressure Transducer Fault | Low Zone Quit |
| Low/High Pressure | Supervisory Power Failure |
| Fail To Start | Genset Fail To Start |
| Fail To Stop | Loss Of Normal Power |

Figure 12:
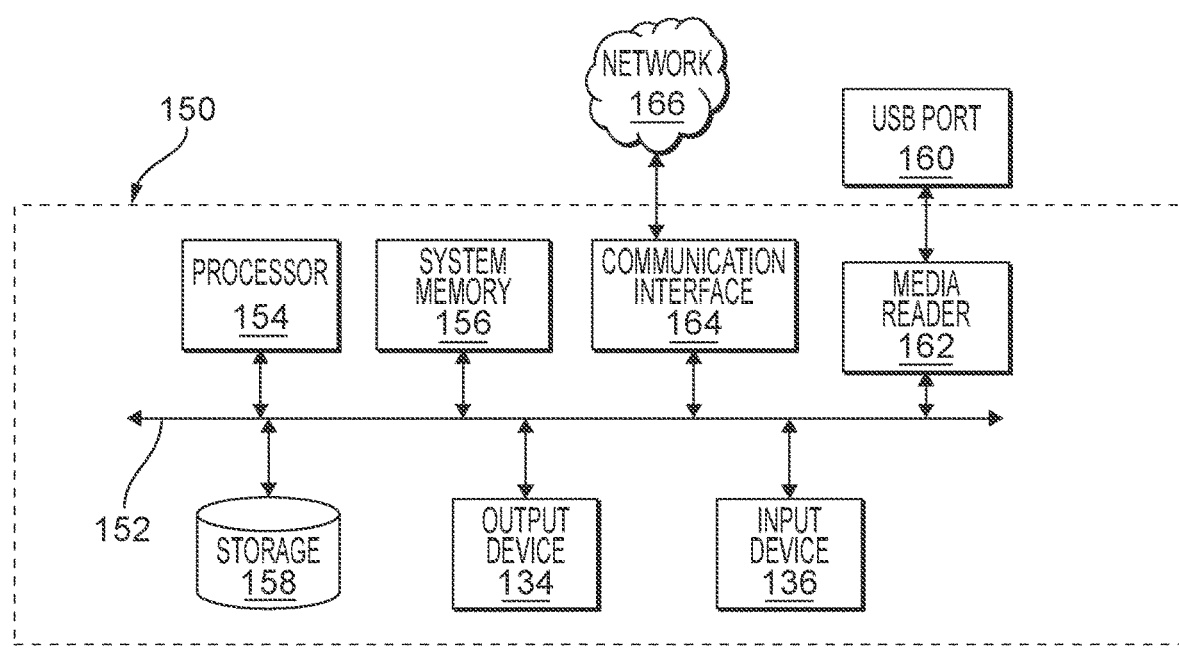
FIG. 12 is a block diagram of an exemplary computing system used in a fire pump controller.

The one or more computing systems 150 incorporated into the FCP 140 may include, for example, one or more microprocessors, microcontrollers, or one or more non-volatile flash-based complex programmable logic devices. Programming of the FPC 140 can be accomplished from a touch pad 136, seen in FIG. 9, mounted on the access door 122 of the fire controller 100. A block diagram of an exemplary computing system 150 is shown in FIG. 12. In this exemplary embodiment, the computing system 150 is interconnected via a bus 152. The computing system 150 includes a processor 154, e.g., a microprocessor or microcontroller, that executes software instructions or code stored in or on, for example, system memory 156 (e.g., volatile memory such as random access memory), or a storage device 158 (e.g., non-volatile memory), to perform the fire pump controller functions. The storage device 158 provides storage space for retaining static data, such as program instructions that could be stored for later execution, and for storing logs, e.g., the data log 42 and the time delta log 30. The processor 154 reads instructions from the storage device 158 or system memory 156, and performs actions as instructed.

The computing system 150 may also include an output device, such as the display module 134, to provide visual information to users, and an input device, such as the touch pad 136, to permit users or other devices to enter data into and/or otherwise interact with the computing system 150. One or more of the output or input devices could be joined by one or more additional peripheral devices using, for example, the USB port 160 and media reader 162, to further expand the capabilities of the computing system 32, as is known in the art. A communication interface 164 may be provided to connect the computing system 150, and thus the fire controller 100, to a network 166, such as the Internet, and in turn to other devices connected to the network 166, including public and non-public users, servers, data stores, and interfaces.

Figure 14:
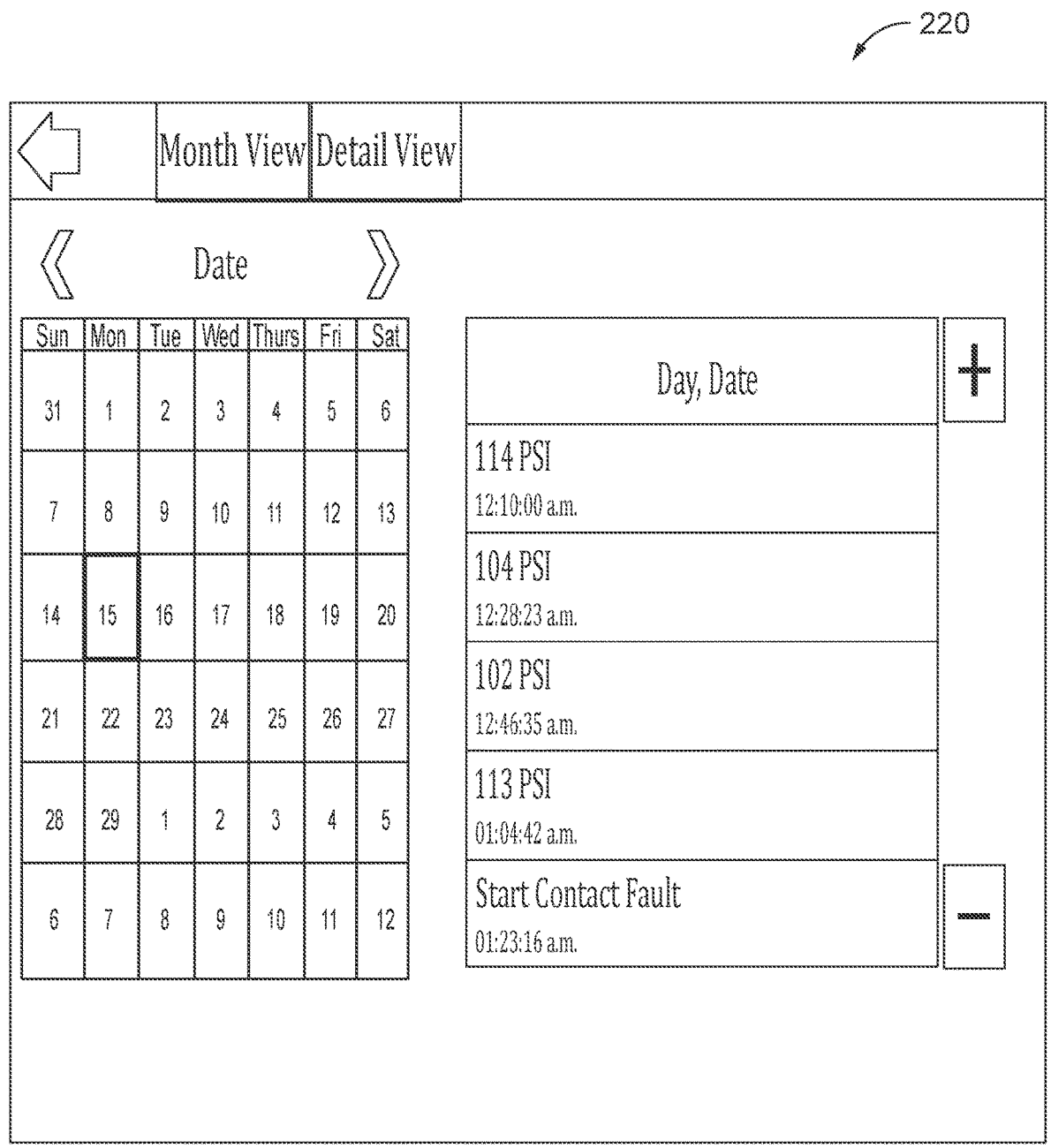
FIG. 14 is an illustration of an exemplary user interface for a calendar/list view for the fire pump controller.
Figure 16:
FIG. 16 is an illustration of an exemplary user interface dashboard for the fire pump controller when the pump motor is in a running mode.
Figure 17:
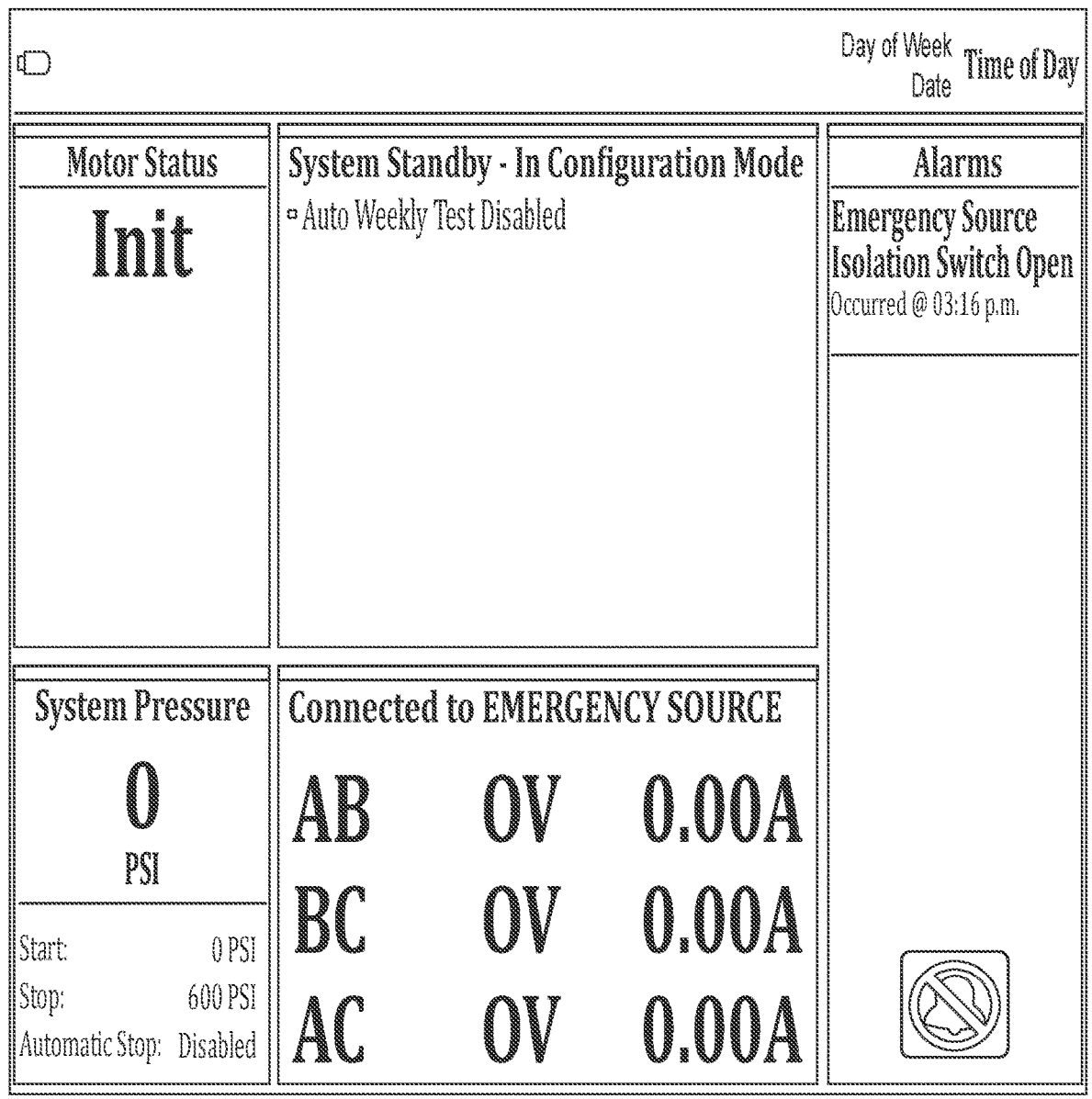
FIG. 17 is an illustration of an exemplary user interface dashboard for the fire pump controller when an alarm is generated and the pump motor is in an interrupt mode.
Figure 18:
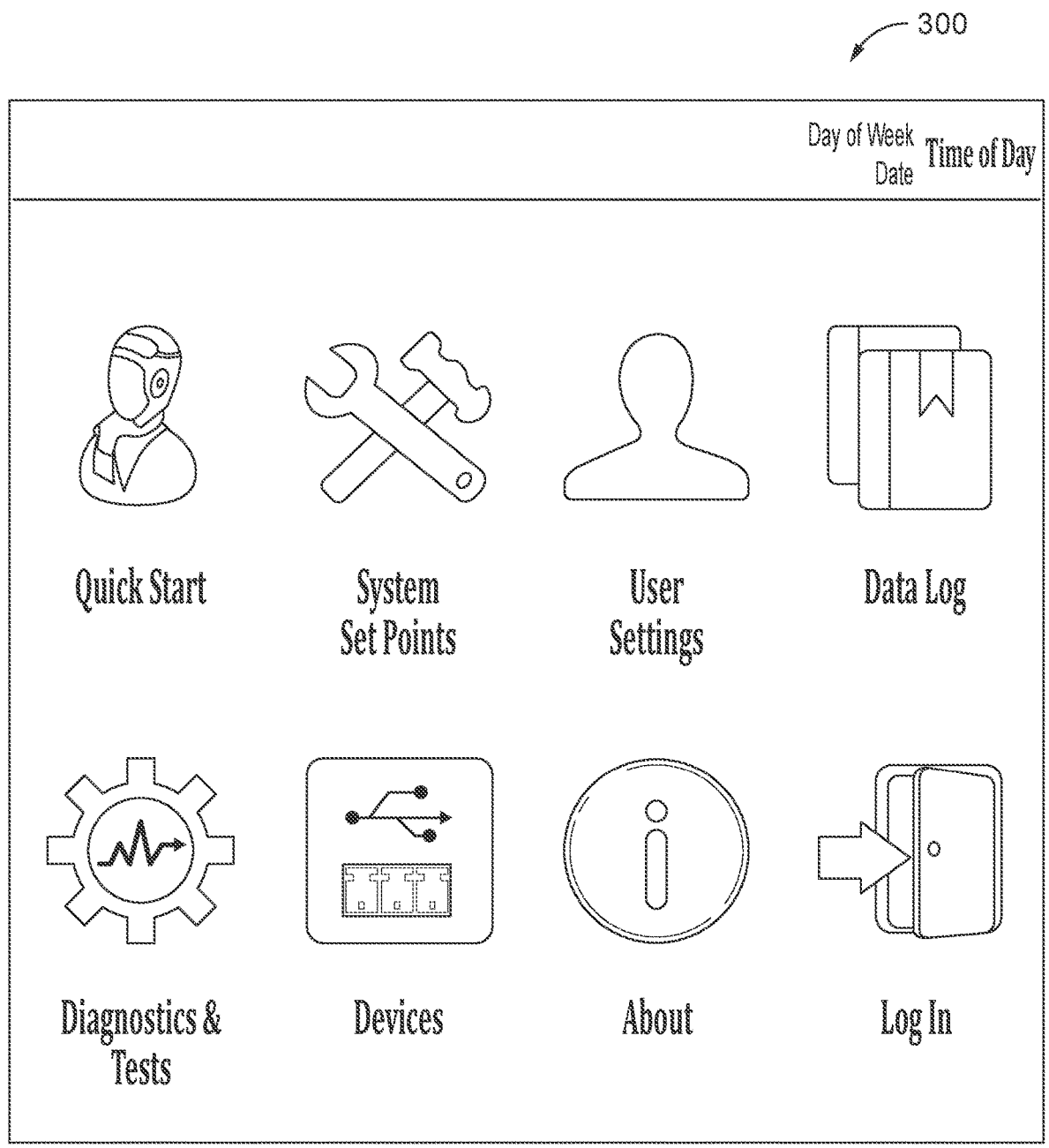
FIG. 18 is an illustrations of an exemplary user interface with icons for various functions of the fire pump controller.

As noted above, a user can retrieve one or more data log records 40 for analysis. FIG. 13 provides an exemplary user interface 200 rendering for a calendar view for the FCP 140 which is displayed on the display module 134. As seen, the calendar view provides a month long summary view of data log record data. FIG. 14 provides an exemplary user interface 220 rendering for a calendar and associated listing providing a listing of data log records and their associated timestamp adjusted using the automatic adjusting data log timestamp method described herein. FIGS. 15-17 provide exemplary user interface dashboards 240, 260 and 280 for the FCP 140 which provides a pump motor status, e.g., idle mode, running mode or interrupt mode. The dashboards also provide various user selectable fire controller 100 information, such as system pressure, the power source providing power to the system, e.g., Normal Source (primary power source) or Emergency Source (secondary power source) and identify any alarms. FIG. 18 provides an exemplary user interface 300 rendering with icons for various functions of the FCP 140, including an icon for accessing and retrieving data log records.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples, a non-exhaustive list, of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this application, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including the Ruby programming language and Rails programming framework, an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations, block diagrams and/or flow representations of methods, apparatus (systems) and computer program products according to embodiments of the present disclosure. It will be understood that each block of the flowchart illustrations, block diagrams and/or flow representations, and combinations of blocks in the flowchart illustrations, block diagrams and/or flow representations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart, block diagram block or blocks and/or flow representations.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart, block diagram block or blocks and/or flow representations.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart, block diagram block or blocks and/or flow representations.

It will be understood that various modifications can be made to the embodiments of the present disclosure without departing from the spirit and scope thereof. Therefore, the above description should not be construed as limiting the disclosure, but merely as embodiments thereof. Those skilled in the art will envision other modifications within the scope and spirit of the invention as defined by the claims appended hereto. As an example, the methods for automatically adjusting data log records according to the present disclosure can be used with any number of computer controlled systems that utilize log records. For example, the methods according to the present disclosure can be used with resistance grounding electrical systems used in industrial electrical power distribution facilities to limit phase-to-ground fault currents. Resistance grounding electrical systems generally have two types of resistors used to tie an electrical system's neutral to ground—low resistance and high resistance. Controllers for detecting and/or locating ground faults or other faults in such resistance grounding electrical systems are known. An example of one such system is described in U.S. Pat. No. 6,888,708 to Brungs et. al. which is incorporated herein in its entirety by reference.

What is claimed is:

1. A method for automatically adjusting a timestamp in a data log record when the data log record is retrieved from a data log containing one or more data log records, the method comprising:

monitoring a system clock to detect changes to the system clock;

in response to detecting a system clock change, adding a time delta record to a time delta log, the time delta record includes a unique time delta identifier and a time delta value;

in response to detecting the time delta record being added to the time delta log, creating a row in an absolute delta look-up table, the row created in the absolute delta look-up table containing an absolute delta look-up table identifier and an absolute time adjustment value, the absolute delta look-up table identifier corresponding to the unique time delta identifier in the time delta record added to the time delta log, and the absolute time adjustment value being a sum of the time delta value added to the time delta log and all succeeding time delta values added to the time delta log;

when each of the one or more data log records are added to the data log, the data log record includes the timestamp identifying when the data log record was created and the most recent absolute delta look-up table identifier in the absolute delta look-up table;

retrieving the data log record from the data log; and each time the data log record is retrieved from the data log, adjusting, for output, the timestamp of the retrieved data log record based upon the absolute time adjustment value in the row in the absolute delta look-up table associated with the absolute delta look-up table identifier in the retrieved data log record, and providing the retrieved data log record with the adjusted timestamp to at least one of an output device and a peripheral device.

2. The method according to claim 1, wherein the time delta value added to the time delta record in the time delta log comprises a difference between a previous system clock time and a system clock time when the system clock change is detected.

3. The method according to claim 1, wherein the unique time delta identifier added to the time delta record in the time delta log is an integer.

4. The method according to claim 1, wherein the at least one output device comprises a display.

5. The method according to claim 1, wherein the at least one periphery device comprises one of a USB stick and a media reader.

6. A method for automatically adjusting a timestamp in a data log record when the data log record is retrieved from a data log containing one or more data log records, the method comprising:

monitoring a system clock to detect changes to the system clock;

in response to detecting a system clock change, calculating a time delta value representing a difference between a previous system clock time and a system clock time when the system clock change is detected;

in response to the time delta value being calculated, adding a time delta record to a time delta log, wherein the time delta record includes a unique time delta identifier and the calculated time delta value;

in response to the time delta record being added to the time delta log, creating a row in an absolute delta look-up table, the row created in the absolute delta look-up table containing an absolute delta look-up table identifier and an absolute time adjustment value, the absolute delta look-up table identifier corresponding to the unique time delta identifier in the time delta record added to the time delta log, and the absolute time adjustment value being a sum of the time delta value added to the time delta log and all succeeding time delta values added to the time delta log;

when each of the one or more data log records are added to the data log, the data log record includes the timestamp identifying when the data log record was created and the most recent absolute data look-up table identifier in the absolute delta look-up table;

retrieving the data log record from the data log; and each time the data log record is retrieved from the data log, adjusting, for output, the timestamp of the retrieved data log record based upon the absolute time adjustment value in the row in the absolute delta look-up table associated with the absolute delta look-up table identifier in the retrieved data log record, and providing the retrieved data log record with the adjusted timestamp to at least one of an output device and a peripheral device.

7. The method according to claim 6, wherein the unique time delta identifier added to the time delta record in the time delta log is an integer.

8. The method according to claim 6, wherein the at least one output device comprises a display.

9. The method according to claim 6, wherein the at least one periphery device comprises one of a USB stick and a media reader.

10. A method for automatically adjusting a timestamp in a data log record when the data log record is retrieved from a data log containing one or more data log records, the method comprising:

monitoring a system cock to detect changes to the system clock;

in response to detecting a system clock change, calculating a time delta value representing a difference between a previous system clock time and a system clock time when the system clock change is detected;

in response to the time delta value being calculated, adding a time delta record to a time delta log, wherein the time delta record includes a unique time delta identifier and the calculated time delta value;

initializing an absolute delta look-up table to define an absolute delta look-up table identifier and an absolute time adjustment value associated with the time delta record added to the time delta log, wherein the absolute delta look-up table identifier corresponds to the unique time delta identifier in the time delta record added to the time delta log;

when each of the one or more data log records are added to the data log, the data log record includes the timestamp identifying when the data log record was created and the most recent absolute delta look-up table identifier in the absolute delta look-up table;

retrieving the data log record from the data log; and each time the data log record is retrieved from the data log, adjusting, for output, the timestamp of the retrieved data log record based upon the absolute time adjustment value in the absolute delta look-up table associated with the absolute delta look-up table identifier in the retrieved data log record, the absolute time adjustment value being a sum of the time delta value added to the time delta log and all succeeding time delta values added to the time delta log, and providing the retrieved data log record with the adjusted timestamp to at least one of an output device and a peripheral device.

11. The method according to claim 10, wherein the unique time delta identifier added to the time delta record in the time delta log is an integer.

12. The method according to claim 10, wherein initializing the absolute delta look-up table comprises:

creating a row in the absolute delta look-up table containing the absolute delta look-up table identifier and the absolute time adjustment value for each time delta record in the time delta log; and creating an active delta index record in the absolute delta look-up table.

13. The method according to claim 12, wherein the absolute delta look-up table identifier corresponds to the time delta identifier in the time delta record added to the time delta log.

14. The method according to claim 10, wherein the at least one output device comprises a display.

15. The method according to claim 10, wherein the at least one periphery device comprises one of a USB stick and a media reader.

* * * * *